Nov. 21, 1950 — W. G. ROMAN — 2,530,993
ELECTRONIC CONTROL SYSTEM FOR DIRECT CURRENT MOTORS
Filed Aug. 10, 1948
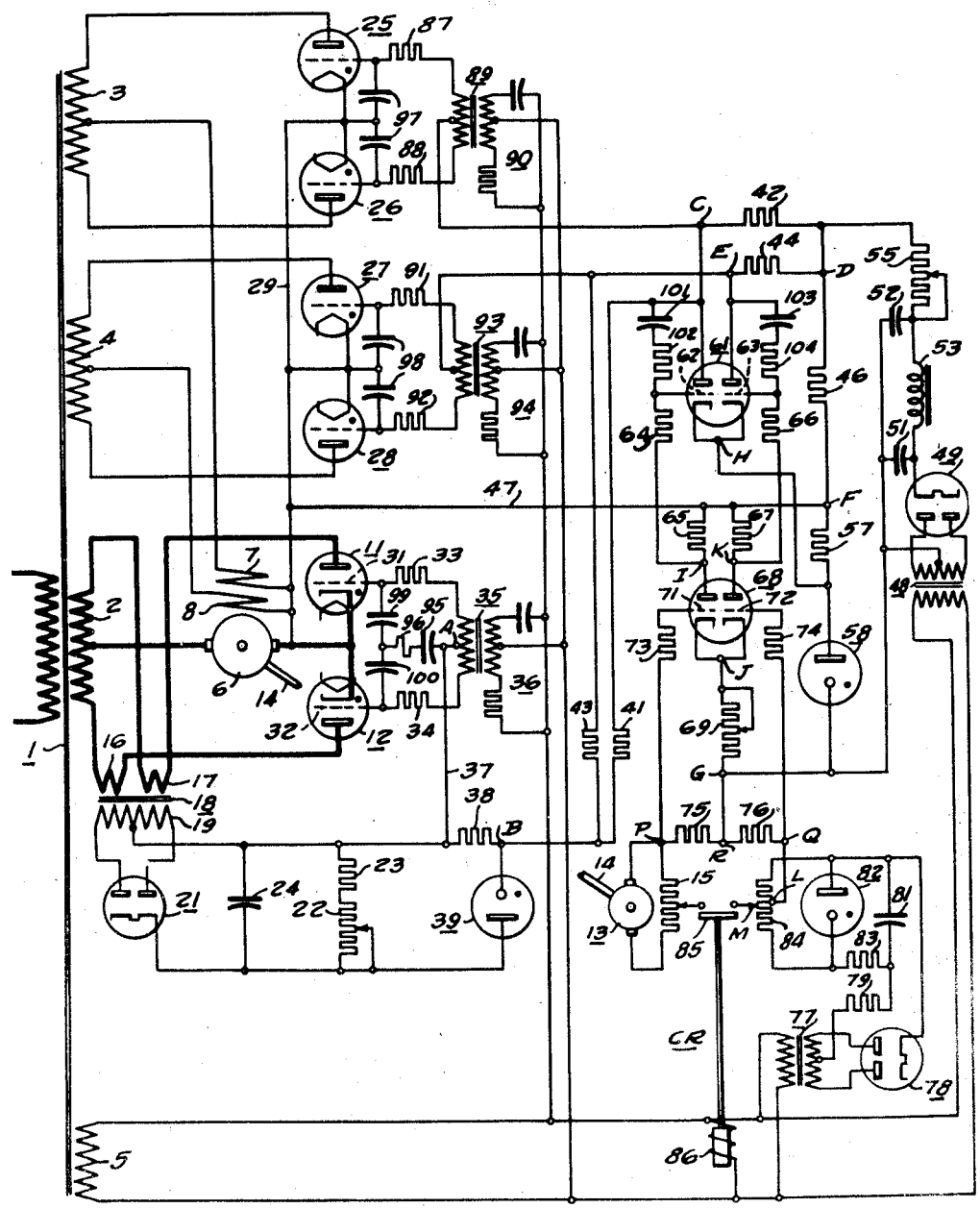
WITNESSES:
E. A. M'Closkey.
Nw. C. Groove
INVENTOR
Walter G. Roman.
BY C. M. Avery
ATTORNEY Patented Nov. 21, 1950

2,530,993

UNITED STATES PATENT OFFICE 2,530,993

ELECTRONIC CONTROL SYSTEM FOR DIRECT-CURRENT MOTORS

Walter G. Roman, Williamsville, N. Y., assignor to Westinghouse Electric Corporation, East Pittsburgh, Pa., a corporation of Pennsylvania Application August 10, 1948, Serial No. 43,414

17 Claims. (Cl. 318—319)

My invention relates to electronically controlled systems for energizing direct-current motors from an alternating-current source and, in some of its aspects, it is related to the invention of W. W. Cotner disclosed in the copending application Serial No. 43,446, assigned to the assignee of the present invention.

It is an object of the invention to provide a system of the mentioned type that is capable of regenerative operation, i. e. permits the motor to feed energy back into the alternating-current supply line when operating under overhauling load conditions. The invention, more specifically, aims at securing such a regenerative operation without requiring the use of reversing contactors and with the aid of a minimum of control tubes and other accessory equipment.

As explained below, the invention involves a system in which the armature current and the field excitation of the motor are both electronically controlled. Referring to such a control, it is another object of the invention to devise a system in which the same control stimulus acts on the armature rectifier as well as on the field rectifiers, and it is also an object to automatically direct the joint control in such a manner that the armature rectifier starts conducting only after the field is excited.

Another object of the invention is to provide a drive system which, though capable of regenerative operation without switching, has its drive speed controlled and regulated, basically, by a corresponding control and regulation of its armature rectifiers and thus by a variation of its armature current rather than by a variable magnitude of field excitation, thus affording high stability of control performance even at low speeds due to the presence of a strong field and a correspondingly reduced armature current at the lower speeds.

According to one feature of my invention, I equip the direct-current motor with split field windings for respectively opposite torques and connect these windings to the alternating-current supply means through respective sets of controllable field rectifier tubes all of which have a conductor or point of potential in common with the cathode of a controllable rectifier for the armature circuit. Extending from this common cathode connection, the grid circuits for the field and armature rectifier tubes are connected together so that a single control stimulus, such as the difference between a reference voltage and a speed-proportional voltage, controls the field rectifiers and the armature rectifier in the proper relation to one another. By virtue of this feature, the system performs its control operation with a minimum of electronic control equipment.

According to another feature of the invention, and referring to a drive system with two field rectifiers to excite the field in one and the other direction respectively, the two field rectifiers have their respective grid circuits connected across respective resistors in the two plate or output circuits of a single or multiple-stage push-pull amplifier which controls the voltages across the two resistors in inverse relation to each other; and the grids in the input stage of the amplifier are interconnected through two resistors which have an intermediate common point connected with the appertaining cathodes and have their respective other end points interconnected through two series-opposed sources of control voltages, one having a magnitude and polarity determined by the magnitude and direction of the speed of the drive and the other having a magnitude and polarity determined by the extent and direction of displacement of a control member from a zero reference position.

These and other objects and features of the invention will be apparent from the following description of the embodiment of a drive system according to the invention exemplified by the circuit diagram shown in the drawing.

In the following description of the illustrated system, parenthetical references are given to commercial type designations of electronic tubes and numerical values of electric quantities. These references are presented only for the purpose of exemplifying one of the possibilities of embodying the invention and hence are not preclusive.

The system is energized from an alternating-current line through a main transformer 1 with secondary windings 2, 3, 4 and 5.

The direct-current motor to be energized and controlled has one terminal of its armature 6 connected to the midtap of the secondary winding 2 and is equipped with split field windings 7 and 8. The other terminal of armature 6 is attached to the cathodes of two rectifier tubes 11 and 12 whose respective anodes are in connection with the ends of the secondary 2. The tubes 11 and 12 consist of controllable gaseous or arc-discharge devices, for instance, thyratrons (type WL-672).

A tachometer generator 13 is connected with the armature 6 or with a part or equipment driven by the motor, the connection being schematically represented by a shaft 14. The output terminals of generator 13 are connected across a potentiometric rheostat 15. The voltage impressed by the generator across rheostat 15 is proportional to the speed to be controlled and regulated.

Connected in the anode leads of the armature rectifiers 11 and 12 are the primaries 16 and 17 of a current transformer 18 whose secondary provides a voltage proportional to the armature current. A full-wave rectifier exemplified by a twin tube 21 (type 6-X5) is connected to the secondary 19 and has its output circuit connected across a potentiometric circuit composed of a resistor 22 (20,000 ohms) and a resistor 23 (33,000 ohms). The rectified voltage, appearing across resistors 22 and 23, is filtered by a capacitor 24 (1 mfd.). This voltage is proportional to the armature current and serves to provide a current limiting control for preventing an excessive armature load current and also for controlling the acceleration of the motor, as will be explained in a later place.

The field winding 7 is energized from the secondary winding 3 through two full-wave connected rectifier tubes 25 and 26. Field winding 8 is energized from secondary 4 through two full-wave connected rectifier tubes 27 and 28. The tubes 25, 26, 27, 28 are controllable gas discharge devices, for instance, thyratrons (type 3C23). Their cathodes are all connected together by a lead 29 which is also attached to the cathodes of the armature rectifier tubes 11 and 12. As will be recognized from the following, this provision of a common cathode connection 29 for all armature and field rectifiers leads to a considerable simplification of the accessory control circuits and permits a corresponding reduction in the number of electronic control tubes, current supplies, and other accessories.

The voltage and current supplied by the rectifier tubes 11 and 12 to the armature 6 depends upon the phase position of the firing point of these tubes relative to the alternating plate voltage, and this phase position is controlled by the voltage conditions in the appertaining control circuit. The control circuit extends from the respective control grids 31, 32 through respective grid resistors 33, 34 (each 220,000 ohms) to the secondary of a phase shift transformer 35 (50 volts secondary). The primary of transformer 35 forms part of a phase shift circuit 36 which is energized from the secondary 5. From the midpoint A of the secondary winding in transformer 35, the control circuit for the armature rectifier extends through a lead 37 and a resistor 38 (68,000 ohms) to a point B to which is attached the cathode of a glow discharge tube 39. Tube 39 consists preferably of a cold cathode tube as customary for voltage regulating purposes (type VR-150) and has a fixed breakdown voltage (150 volts). From point B, the control circuit for the armature rectifier splits into two parallel sections. One section extends from point B through a resistor 41 (220,000 ohms) to a point C and thence through a resistor 42 (33,000 ohms) to a point D. The other section extends from point B through a resistor 43 (220,000 ohms) to a point E and thence through a resistor 44 (33,000 ohms) to point D. From point D, the grid circuit extends through a resistor 46 (10,000 ohms) to point F which is electrically connected by a lead 47 with the common cathode lead 29.

This control circuit for the armature rectifier includes three sources of component grid voltages for each tube 11 and 12. One of the component grid voltages is supplied from the grid transformer 35 and consists in an alternating-current voltage which is synchronous with the anode voltage of the respective rectifier tubes and properly dephased relative thereto.

A second source of grid voltage for the armature rectifier is represented by the resistor 46. This resistor is impressed by a constant direct-current voltage which represents a constant grid bias in the control circuit of the armature rectifiers. The constant voltage drop across resistor 46 is supplied from a direct-current source composed as follows. A transformer 48 is energized from the secondary 5 and applies its output voltage to a twin rectifier 49 (type 5Y3). The rectified voltage from tube 49 is filtered by capacitors 51 (2 mfd.), 52 (8 mfd.) and a reactor 53 and is impressed through a resistor 55 (1500 ohms) across a series connection which extends between points D and G and includes the above-mentioned resistor 46, a resistor 57 (6000 ohms) and a voltage regulating tube 58. Tube 58 may consist of a cold cathode tube (type VR150). The rectified and filtered voltage applied to the end points D and G of the just-mentioned series connection may amount to 375 volts. Under the exemplified ratings, the voltage drop across tube 58 remains constant at 150 volts. The voltage drop across resistor 57 is constant at about 85 volts and the voltage drop across resistor 46 is constant at about 140 volts and as mentioned serves as a constant grid bias in the control circuit of the armature rectifier tubes.

A third source of grid voltage for the armature rectifier is represented jointly by the resistors 42 and 44. The voltage impressed on the control circuit from these resistors is variable and determines the phase position of the firing point and hence the voltage and current in the armature circuit. The variable voltage across resistors 42 and 44 is controlled by the following devices. Resistors 42 and 44 represent respective loads in the two plate circuits of an amplifying twin tube 61 (type 6SN7), whose appertaining control grids are denoted by 62 and 63, respectively. One plate circuit of tube 61 extends from one of its anodes through point C and resistor 42 to point D, thence through resistor 46, point F and resistor 57 to a point H of the common cathode lead of the tube 61. The other plate circuit extends through point E, resistor 44, point D, resistor 46, point F, resistor 57 to point H. Both plate circuits are energized by the constant voltage drop across resistors 46 and 57. The variable voltage impressed across resistors 42 and 44 depends upon the conductance of the respective discharge paths in tube 61, and their conductance is controlled by the voltage conditions in the respective circuits of grids 62 and 63 in the manner described below.

A fourth source of component grid voltage for the armature rectifier tubes 11 and 12 is represented by the resistor 38. However, the resistor 38 is effective as a grid voltage source only when the tube 39 is conductive, that is, when the current in the motor armature circuit exceeds a predetermined value at which the voltage impressed across tube 39 exceeds the breakdown voltage (150 volts) of this tube. The voltage then appearing across resistor 38 changes the phase position of the firing points in the armature rectifier tubes in the direction required to reduce and limit the armature current. The current value at which the tube 39 and the resistor 38 become thus effective is adjustable by means of the rheostat 22.

It has been explained that the armature current is normally dependent upon the conductance and grid circuit conditions of the tube 61. The grid circuit for tube 61 has one section extending from grid 62 through a resistor 64, (220,000 ohms) to point I, and through a resistor 65 (68,000 ohms) to point F, thence through resistor 57 to the cathode point H. The other section of the grid circuit extends from grid 63 through a resistor 66 (220,000 ohms) and a resistor 67 (68,000 ohms) to point F. Thence this section follows the same path as the first-mentioned section to cathode point H. The grid circuit for tube 61 includes the resistor 57 as a source of a constant grid bias, and each of its circuit sections also includes the resistor 65 or 67 as a source of a variable grid bias. This variable grid bias controls the conductance of the respective discharge paths in tube 61 and depends upon the operating condition of a twin control tube 68 (type 6SL7).

One plate circuit of tube 68 extends through resistor 65, resistor 57, tube 58, point G and a resistor 69 (1000 ohms) to a point J, common to the cathodes of tube 68. The other plate circuit extends through point K, resistor 67, at point L and a displaceable slider M. Slider M is connected with the slider of tachometer rheostat 15 through the contact 85 of a relay CR whose coil 86 is energized from the secondary 5. Relay CR closes the contact 85 whenever the transformer 1 is sufficiently energized.

It will be recognized from the foregoing that the armature rectifiers 11 and 12 are controlled in dependence upon the algebraic sum of the two control voltages from the adjusted portion of the speed control rheostat 84 and from the active portion of the tachometer rheostat 15 respectively, this control being effective through the tube 68 and the tube 61 to vary the voltage drop across resistors 42 and 44 which apply respective variable grid voltages to the armature rectifier tubes.

Before explaining this control performance more in detail, a description of the grid circuits for the field rectifier tubes will be given. The grid circuit for the field rectifier tubes 25 and 26 extends through respective resistors 87 and 88 (each 220,000 volts) to the ends of the secondary winding of a grid voltage transformer 89 which forms part of a phase-shift circuit 90 and is energized from the secondary 5 of the main transformer 1. From the midpoint of the secondary of the transformer 89, the grid circuit for tubes 25 and 26 extends to point C and through resistors 42 and 46 to the lead 47 attached to the common rectifier cathode lead 29.

The grid circuit for field rectifier tubes 27 and 28 extends through resistors 91 and 92 (each 220,000 ohms) to a grid transformer 93 which forms part of a phase-shift transformer 94 energized from the secondary 5. The midpoint of the secondary in transformer 93 is connected to point E and extends through resistors 44 and 46 to lead 47 and the common cathode lead 29.

The grid circuits for the two sets of field rectifier tubes include each a source of an alternating component grid voltage represented by transformer 89 or 93, and also a source of constant grid bias voltage represented by the resistor 46. In addition, the grid circuit for tubes 25 and 26 includes the resistor 42 which provides a speed-responsive variable unidirectional component whose magnitude determines whether or not the tubes 25 and 26 are conductive. Similarly, the grid circuit for the field rectifier tubes 27 and 28 includes the resistor 44 as a source of variable voltage which is controlled in response to speed to render the tubes 27 and 28 conductive or non-conductive.

It is an essential advantage that the constant grid bias for the field rectifiers derived from resistor 46, originates from the same direct-current supply that also provides a constant grid bias for the armature rectifiers. It will further be recognized that the resistors 42 and 44 which determine the firing point of the field rectifiers are the same elements that control the firing point of the armature rectifier tubes. Consequently, the above-mentioned circuits including the tubes 61 and 68, as well as the tachometer rheostat 15 and the speed control rheostat 84, are also effective to control the firing condition of the field rectifiers. In this manner, and as will be more accurately apparent from the following description of the performance of the complete system, the same resistor 57, tube 58, point G and resistor 69 to the cathode point J. Both plate circuits of tube 68 are energized by the voltage drop across resistor 57 and tube 58. The variable voltage appearing across resistors 65 and 67 depends upon the conductance of the respective discharge paths of tube 68, and this conductance is controlled by the conditions of the grid circuits attached to the respective control grids 71 and 72.

The circuits for grids 71 and 72 extend through respective resistors 73, 74 (each 220,000 ohms) and through respective resistors 75, 76 (each 33,000 ohms) to a common point which is attached through the resistor 69 to the cathode point J of tube 68. The two discharge paths of tube 68 are thus controlled by the variable voltage drops impressed across the resistors 75 and 76. This voltage drop is the differential resultant of two control voltages. One control voltage is derived from the tapped-off portion of the tachometer rheostat 15 and, as explained, is proportional to the speed to be controlled and regulated. The other control voltage is provided by a constant voltage supply composed as follows.

A transformer 77 is energized from the secondary 5 of the main transformer 1 and applies its secondary voltage to a twin rectifier 78 (type 6X5). The rectified voltage is impressed through a resistor 79 (4000 ohms) across a filtering capacitor 81 (4 mfd.) which is paralleled by the series connection of voltage regulating tube 82 with a resistor 83 (6000 ohms). The tube 82 consists preferably of a cold cathode glow tube (type VR 150). Attached across tube 82 is a speed control rheostat 84 with a fixed midtap set of control devices operates to jointly control the armature and field rectifiers in cooperative relation to one another. This not only secures a desired advantageous performance of the system but also leads to a considerable reduction in the amount of equipment and a corresponding simplification of the circuits and necessary circuit adjustments.

Connected between the cathodes of the armature rectifier tubes 11 and 12 and the midpoint A of the secondary in grid transformer 35 is a capacitor 95 (2 mfd.) in series with a resistor 96 (22,000 ohms). The circuit 95—96 has the effect of preventing hunting of the armature rectifier control and also limits the current peaks that may be imposed on the armature rectifiers, especially during the initial portion of starting periods.

The capacitors denoted by 97, 98, 99 and 100 are customary grid capacitors of small capacitance (.005 mfd.). The two sections of tube 61 are preferably equipped with a negative feedback circuit to reduce hunting tendencies. One feedback circuit is composed of a capacitor 101 (.01 mfd.) and a resistor 102 (22,000 ohms) and extends between one anode and the appertaining grid 62 of tube 61. The other feedback circuit is composed of a capacitor 103 (.01 mfd.) and a series-connected resistor 104 (22,000 ohms) and extends between the other anode and the grid 63.

The system as a whole operates in the following manner.

Assume that tap point M on the speed control rheostat 84 is set at the same potential as point L. With this setting, and contact 85 of relay CR closed, points P and Q are at the same potential as point R. The grids 71, 72 attached to respective points P and Q are negative by an amount determined by the setting of the bias control resistor 69. Since with equal grid potentials, the two parts of tube 68 conduct currents of equal magnitude, points I and K are at the same potential with respect to point H. Under these conditions, the two parts of the tube 61 conduct currents of equal magnitude. As a result, points E, C and B are at the same potential with respect to point F. With the proper selection of circuit constants, points E, C and B may be made sufficiently negative with respect to point F to bias all thyratrons to cutoff. Therefore, the conditions are not appropriate for the motor to produce positive torque. Hence this setting of point M may be called the "quiescent" setting. It is to be noted that point B is approximately half-way between point D and points C, E in potential.

Now, assume that the tap point M is moved (upwardly) toward the positive end of the control potentiometer 84. Then point P becomes positive with respect to point R, and point Q becomes negative with respect to point R. The magnitude of the currents in tube 68 now changes so that point K becomes more positive with respect to point H, and point I becomes more negative with respect to point H as compared with the quiescent setting. For similar reasons, unequal magnitudes of current in the two parts of tube 61 will result, and point C becomes more positive with respect to point F, while point E becomes more negative with respect to point F, than is the case at the quiescent setting of point M. Thus, by making point C positive enough with respect to point F, tubes 25 and 26 conduct current through the (reverse) field winding 7. The grids of tubes 27 and 28 are made more negative than at the quiescent setting of point M and hence they do not supply current to the (forward) field winding 8. Due to the non-linear characteristics of tube 61, and due to the fact that point B is essentially midway between the potentials of points E and C, point B does not change its potential with respect to point F as much as do the points E and C. Due to the mentioned displacement of point M, the part of tube 61 connected to point I approaches "cutoff" of current. Point B becomes more positive with respect to point F but at a smaller amount than point C. Therefore, the field winding to be excited can have full voltage applied, and this will occur before current is conducted by the armature tubes. This is a desirable condition for good operation where the armature current is controlled to control the torque of the motor.

Still referring to the above-mentioned displacement of slider point M toward the positive (upward) end of rheostat 84, assume that point M is placed away from the quiescent position by an amount enough to allow for rated armature current. Since the (reverse) field winding 7, as explained, is not at full rated voltage, rated torque is produced and the motor starts rotating. As the speed increases, the tachometer voltage increases proportionately. The tachometer rheostat 15 is connected with such a polarity that its voltage tends to bring the resultant potential of points P and Q with respect to point R back to the quiescent value, i. e. zero. Thus, as the motor speed increases, the firing angle of tubes 11 and 12 is changed so that the armature current is just sufficient to supply the required torque. In other words, the speed for any reference voltage from rheostat 84 is such, that the voltage difference between the reference voltage and the tachometer voltage is just enough to adjust a firing angle for tubes 11 and 12 that will allow the required current to flow in the armature.

If the reference point M is moved in the opposite direction from the quiescent point, the forward field winding 8 is supplied with current and forward rotation will result for reasons analogous to those explained for the reverse field.

When the motor is operating at some speed and the point M is moved toward the quiescent setting, the result is the same as if the point M were moved away from the quiescent point by an amount that would produce a reference voltage equal to the difference between the tachometer voltage and reference voltage but opposite in polarity to that produced by the original displacement. Hence, the field for opposite rotation is supplied with current and negative torque under regenerative operation will be produced if conditions are appropriate.

Assume that the motor is operating at some speed and that the positive load torque is increased so that the motor tends to slow down. Any such reduction in speed increases the difference between the reference and tachometer voltages. This causes the firing angle of tubes 11 and 12 to change so that more current is supplied to the armature, thus restoring the proper speed. Consequently, the speed is regulated to remain at the value determined by the position of point M regardless of load variations within the available load range.

Assume that the motor is operating at some speed under a positive torque load, and that the load is changed to a negative (overhauling) torque load. The motor then tends to speed up and the tachometer voltage would become greater than the reference voltage. The result is the same as if the point M were moved away from the quiescent point in a direction opposite to that of the original displacement by an amount that would produce a reference voltage equal to the difference between the tachometer voltage and the reference voltage. Regeneration will result if other conditions are appropriate.

Under the above-described conditions of bias adjustment, the occurrence of any change of operating conditions that calls for a regenerative performance, i. e. for torque opposed to the running direction, causes the other field rectifier and field winding to become effective, thus permitting regeneration as long as the motor torque remains opposed to that caused by the field of the newly activated winding. This performance may be looked upon as involving essentially a flip-flop control of the motor field. That is, for any major changes in control or operating conditions calling for negative torque (regeneration), the direction of the motor field is reversed and is immediately effective at appreciable or normal strength while the speed regulation remains taken care of by the control of the armature rectifier.

It will be obvious that systems according to the invention can be modified in various ways without interfering with the desired essential objects or functions. For instance, single-phase or polyphase rectification may be used for the armature or field rectifiers or both, or two individual tubes may be used instead of the illustrated twin tubes. The number of amplifying stages between the sources of control voltages (15, 84) and the field rectifiers may be changed, or a single direct-current source of constant voltage may be employed instead of the two shown in the drawing. Such and other modifications and equivalents are too obvious and readily understood on the basis of the illustrated example to require additional illustration or explanation. It should therefore be understood that the invention is not limited to the embodiment specifically described in this disclosure but can be reduced to practice in various other ways without departing from the objects and essential features of the invention and within the scope of the claims annexed hereto.

I claim as my invention:

1. A drive control system, comprising alternating-current supply means, two controllable electronic rectifiers, a direct-current motor having an armature and a field winding connected through said respective rectifiers to said supply means, said rectifiers having a cathode lead in common and having respective grid circuits, and control means connected between said lead and said respective grid circuits and having a source of variable voltage for controlling said two rectifiers.

2. A drive control system, comprising alternating-current supply means, two electronic rectifiers, a direct-current motor having an armature and a field winding connected through said respective rectifiers to said supply means, said rectifiers having a cathode lead in common and having respective grid circuits, control means connected between said lead and said respective grid circuits and having a source of variable voltage for controlling said two rectifiers, and constant grid bias supply means connected in said respective grid circuits and having a bias adjustment for making said field rectifier conductive prior to conductance of said armature rectifier when said voltage varies from the zero speed value.

3. A drive control system, comprising alternating-current supply means, two electronic rectifiers, a direct-current motor having an armature and a field winding connected through said respective rectifiers to said supply means, said rectifiers having a cathode lead in common and having respective grid circuits which have a common portion attached to said lead, a resistor connected in said common portion, an amplifier having a plate circuit which includes said resistor to impress variable voltage thereon and having another grid circuit, and a source of variable control voltage connected with said other grid circuit for controlling said variable voltage.

4. A drive control system, comprising a reversible direct-current motor having an armature and two split field windings, alternating-current supply means, an electronic armature rectifier connecting said armature with said means and having a control circuit, two electronic field rectifiers connecting said respective windings to said means and having respective grid circuits, all of said rectifiers having a cathode lead in common so as to have the same cathode potentials, control means including a source of reversible voltages of variable magnitude and being connected between said lead and said respective control and grid circuits to control the conductance of said armature rectifier in dependence upon said magnitude and activating either of said field rectifiers dependent upon the polarity of said voltage.

5. A drive control system, comprising a reversible direct-current motor having an armature and two split field windings, alternating-current supply means, two thyratrons in full-wave rectifying connection between said means and said armature, two pairs of full-wave connected thyratrons disposed between said means and said respective windings, said thyratrons having a cathode lead in common and having respective grids, and control means connected between said lead and said respective grids and having a source of reversible control voltage for controlling said armature-connected thyratrons and activating one of said pairs depending upon the polarity of said voltage.

6. A drive control system, comprising a direct-current motor having an armature and reversible field means, alternating-current supply means, an electronic armature rectifier connecting said armature with said supply means and having a control circuit, two electronic field rectifiers connected between said supply means and said field means to provide a field of a polarity dependent upon which field rectifier is conductive, said field rectifiers having respective control circuits, said three control circuits having a conductor in common, said armature rectifier and said two field rectifiers having respective cathodes, said common conductor being attached to all of said cathodes so that said cathodes and said conductor have the same potential, a source of reversible control voltage, control means connected with said source to be controlled by said voltage and being connected in said control circuit of said armature rectifier for controlling the armature current in accordance with the magnitude of said voltage, said control means being also connected with said control circuits of said field rectifiers for controlling them to reverse the field polarity in dependence upon reversal of said voltage.

7. A drive control system, comprising a direct-current motor having an armature and reversible field means, alternating-current supply means, an electronic armature rectifier connecting said armature with said supply means and having a control circuit, two electronic field rectifiers connected between said supply means and said field means to provide a field of a polarity dependent upon which field rectifier is conductive, said armature rectifier and said field rectifiers having a common cathode conductor to maintain the same cathode potential, said field rectifiers having respective grid circuits which extend to said common conductor and include two respective resistors that are also connected with said control circuit so that a voltage variation across either resistor controls the conductance of the appertaining one field rectifier as well as the conductance of said armature rectifier, a push-pull amplifier having two plate circuits extending through said respective resistors and having two respective grid circuits, and control means having a source of reversible voltage connected to said amplifier grid circuits for controlling said voltage variations in inverse relation to each other.

8. A drive control system, comprising a direct-current motor having an armature and reversible field means, alternating-current supply means, an electronic armature rectifier connecting said armature with said supply means and having a control circuit, two electronic field rectifiers connected between said supply means and said field means to provide a field of a polarity dependent upon which field rectifier is conductive, said field rectifiers having respective grid circuits which include two respective resistors for impressing variable grid voltages on said grid circuits respectively, said two resistors being also connected in said control circuit in parallel relation to each other so that each of said grid voltages control one of said respective field rectifiers and also said armature rectifier, a push-pull amplifier having two plate circuits extending through said respective resistors to impress said respective grid voltages on said resistors, said amplifier having two grid circuits for controlling said respective grid voltages, and means for supplying reversible control voltage connected to said amplifier grid circuits for controlling said grid voltages in inverse relation to each other, whereby the field of said field means is reversed when said control voltage reverses.

9. A drive control system, comprising a direct-current motor having an armature and reversible field means, alternating-current supply means, an electronic armature rectifier connecting said armature with said supply means and having a control circuit, two electronic field rectifiers connected between said supply means and said field means to provide a field of a polarity dependent upon which field rectifier is conductive, said field rectifiers having respective grid circuits which include two respective resistors for impressing variable grid voltages on said grid circuits respectively, said two resistors being also connected in said control circuit in parallel relation to each other so that each of said grid voltages controls one of said respective field rectifiers and also said armature rectifier, a push-pull amplifier having two plate circuits extending through said respective resistors to impress said respective grid voltages on said resistors, said amplifier having a cathode lead and two grid circuits, two resistance members series-connected with each other and having a common point connected with said cathode lead and being disposed in said respective amplifier grid circuits, and a source of reversible control voltage attached across said two resistors for controlling said grid voltages in inverse relation to each other.

10. A drive control system, comprising a direct-current motor having an armature and reversible field means, alternating-current supply means, an electronic rectifier connecting said armature with said supply means and having a control circuit, two electronic field rectifiers connected between said supply means and said field means to provide a field of a polarity dependent upon which field rectifier is conductive, said field rectifiers having respective grid circuits which include two respective resistors for impressing variable grid voltages on said grid circuits respectively, said two resistors being also connected in said control circuit in parallel relation to each other so that each of said grid voltages controls one of said respective field rectifiers and also said armature rectifier, a push-pull amplifier having two plate circuits extending through said respective resistors and having two grid circuits for controlling said respective grid voltages, variable voltage control means, said amplifier grid circuits being connected to said control means in mutually opposed polarity of connection so that said grid voltages vary in inverse relation to each other in response to voltage changes of said control supply means, said grid circuits of said field rectifiers having means for supplying a constant grid bias for biasing said field rectifiers substantially to cutoff when said voltage of said control means has a given magnitude whereby a departure from said magnitude activates only one of said field rectifiers depending upon the direction of voltage change.

11. A drive control system according to claim 9 wherein said source of reversible control voltage comprises a constant voltage circuit having a speed control rheostat with a displaceable tap, said rheostat having a point intermediate the limits of tap displacement connected with one of said resistance members at a point electrically remote from said common point, a source of reversible speed responsive voltage connected between said tap and a point of said other resistor electrically remote from said common point so that said control voltage is the resultant of said speed responsive voltage and an adjusted voltage from said rheostat.

12. A drive control system, comprising a direct-current motor having an armature and reversible field means, alternating-current supply means, an electronic armature rectifier connecting said armature with said supply means and having a control circuit, two electronic field rectifiers connected between said supply means and said field means to provide a field of a polarity dependent upon which field rectifier is conductive, said field rectifiers having respective grid circuits which include two respective resistors for impressing variable grid voltages on said grid circuits respectively, said two resistors being also connected in said control circuit in parallel relation to each other so that each of said grid voltages controls one of said respective field rectifiers and also said armature rectifier, a push-pull amplifier having two plate circuits extending through said respective resistors and having a cathode lead and two grid circuits, two resistance members series-connected with each other and having a common point connected with said cathode lead and being disposed in said respective amplifier grid circuits, a constant voltage circuit having a speed control rheostat with a displaceable tap, said rheostat having a point intermediate the tap displacement limits connected with one of said resistance members at a point electrically remote from said common point, speed responsive voltage means having a tachometer generator subject to the drive speed of the system and being connected between said tap and a point of said other resistor electrically remote from said common point, and constant grid bias means in said field rectifier grid circuits for biasing both field rectifiers substantially to cutoff when said tap is positioned to have the potential of said rheostat point and said drive speed is zero.

13. A drive control system, comprising alternating-current supply means, two electronic rectifiers, a direct-current motor having an armature and a field winding connected through said respective rectifiers to said supply means, said rectifiers having respective grid circuits with voltage supply means for providing component grid voltages of a given characteristic, a first resistor disposed in said grid circuit of said rectifier for said field winding to provide variable grid voltage, a control tube having a plate circuit extending through said first resistor and having a grid circuit with a variable voltage source for controlling said variable grid voltage, a second resistor connected only in said grid circuit of said armature rectifier, said first resistor being also connected in said latter grid circuit in series with said second resistor so that said variable grid voltage, when varying, has a lesser effect on said armature rectifier than on said field rectifier in order to excite said field winding before said armature rectifier starts conducting.

14. A drive control system, comprising alternating-current supply means, two electronic rectifiers, a direct-current motor having an armature and a field winding connected through said respective rectifiers to said supply means, said rectifiers having a cathode lead in common and having respective grid circuits, said grid circuits having a common portion attached to said lead and equipped with bias voltage means for normally biasing said rectifiers substantially to cutoff, a first resistor disposed in said common portion to provide variable grid voltage, a control tube having a plate circuit extending through said first resistor and having a grid circuit with a variable voltage source for controlling said variable grid voltage, a second resistor connected in said grid circuit of said armature rectifier outside said common portion and having a larger resistance magnitude than said first resistor so that said variable grid voltage has a lesser effect on said armature rectifier than on said field rectifier in order to cause said field rectifier to provide substantially full field when said armature rectifier starts conducting.

15. A drive control system, comprising alternating-current supply means, two electronic rectifiers, a direct-current motor having an armature and a field winding connected through said respective rectifiers to said supply means, said rectifiers having a cathode lead in common and having respective grid circuits, said grid circuits having a common portion attached to said lead and equipped with bias voltage means for normally biasing said rectifiers substantially to cutoff, a first resistor disposed in said common portion to provide variable grid voltage, a control tube having a plate circuit extending through said first resistor and having a grid circuit for controlling said variable grid voltage, a second resistor connected to said grid circuit of said armature rectifier outside said common portion, a constant voltage source having a potentiometric rheostat for providing adjustable pattern voltage, a tachometer generator for providing a pilot voltage responsive to the motor speed, and circuit means connecting said rheostat and said generator to said grid circuit of said control tube in opposed voltage relation to each other.

16. A drive control system, comprising a direct-current motor having an armature and reversible field means, alternating-current supply means, an electronic armature rectifier connecting said armature with said supply means and having a control circuit, two electronic field rectifiers connected between said supply means and said field means to provide a field of a polarity dependent upon which field rectifier is conductive, said field rectifiers having respective grid circuits which include two respective resistors to be impressed with variable grid voltages respectively, said control circuit being branched into two parallel sections, each of said sections including one of said respective resistors and having a resistance member of larger resistance than said resistor connected in series with said resistor so that each of said grid voltages controls one of said respective field rectifiers and to a lesser extent also said armature rectifier, a push-pull amplifier having two plate circuits extending through said respective resistors to impress said respective grid voltages thereon, said amplifier having two grid circuits, and means for supplying reversible control voltage connected to said amplifier grid circuits for controlling said grid voltages in inverse relation to each other.

17. A drive control system, comprising a direct-current motor having an armature and two field windings for mutually opposing field polarities respectively, alternating-current supply means, an electronic armature rectifier connecting said armature with said supply means and having a control circuit, two electronic field rectifiers connected between said supply means and said respective windings, and having two respective grid circuits, said armature and field rectifiers having a cathode lead in common, said control circuit and said grid circuits having a common portion connected to said lead and including a constant bias supply member, said control circuit having two parallel sections branching off from said common portion and having in each of said sections a first resistor adjacent to said common portion and a second resistor series-connected with said first resistor and having a common terminal lead with the second resistor of the other section, a push-pull amplifier having two plate circuits, said sections having only said first resistors connected in said respective grid circuits and in said respective plate circuits, said amplifier having two grid circuits for controlling said respective plate circuits to impress variable grid voltage across said respective first resistors, a source of reversible control voltage, and circuit means connecting said amplifier grid circuits to said source in inverse polarity relation to each other.

WALTER G. ROMAN.

REFERENCES CITED

The following references are of record in the file of this patent:

UNITED STATES PATENTS

| Number | Name | Date |
|---|---|---|
| 2,312,117 | Moyer | Feb. 23, 1943 |
| 2,404,641 | Leigh | July 23, 1946 |
| 2,421,632 | Livingston | June 3, 1947 |